(12) United States Patent
Weir et al.

(10) Patent No.: US 7,729,811 B1
(45) Date of Patent: Jun. 1, 2010

(54) SYSTEMS AND METHODS FOR UTILITY GRID POWER AVERAGING, LONG TERM UNINTERRUPTIBLE POWER SUPPLY, POWER LINE ISOLATION FROM NOISE AND TRANSIENTS AND INTELLIGENT POWER TRANSFER ON DEMAND

(75) Inventors: Richard D. Weir, Cedar Park, TX (US); Carl W. Nelson, Austin, TX (US)

(73) Assignee: EEStor, Inc., Cedar Park, TX (US)

( * ) Notice: Subject to any disclaimer, the term of this patent is extended or adjusted under 35 U.S.C. 154(b) by 0 days.

(21) Appl. No.: 11/499,594

(22) Filed: Aug. 4, 2006

Related U.S. Application Data

(63) Continuation-in-part of application No. 11/400,875, filed on Apr. 10, 2006, now Pat. No. 7,595,109, which is a continuation of application No. 09/833,609, filed on Apr. 12, 2001, now Pat. No. 7,033,406.

(51) Int. Cl.
*G06F 19/00* (2006.01)
*H01G 4/20* (2006.01)

(52) U.S. Cl. .................. 700/295; 700/286; 700/292; 361/313; 29/25.42; 29/25.41

(58) Field of Classification Search .......... 428/209; 700/286, 288, 292, 295; 29/25.41, 25.42; 361/313

See application file for complete search history.

(56) References Cited

U.S. PATENT DOCUMENTS

| | | | |
|---|---|---|---|
| 3,947,553 A | 3/1976 | Moss | |
| 4,054,598 A | 10/1977 | Blum et al. | |
| 4,671,618 A * | 6/1987 | Wu et al. | ........... 349/92 |
| 4,733,328 A | 3/1988 | Blazej | |
| 4,772,576 A | 9/1988 | Kimura et al. | |
| 4,834,952 A | 5/1989 | Rollat | |
| 4,839,339 A | 6/1989 | Bunker et al. | |
| 5,011,804 A | 4/1991 | Bergna et al. | |
| 5,017,446 A * | 5/1991 | Reichman et al. | ........... 429/225 |

(Continued)

FOREIGN PATENT DOCUMENTS

EP    1020487 A1 *  7/2000

(Continued)

OTHER PUBLICATIONS

Bruno et al., "High-Performance Multilayer Capacitor Dielectrics from Chemically Prepared Powders," Journal of the American Ceramic Society, vol. 76, No. 5, pp. 1233-1241, 1993.

(Continued)

*Primary Examiner*—Michael D Masinick

(57) ABSTRACT

The use of electrical energy storage unit (EESU) technology can provide power averaging for utility grids. Such EESUs can also be used to construct a system capable of storing electrical energy over specified periods (e.g., 24 hours) to provide peak power to homes, commercial sites, and industrial sites. By charging these power averaging units during non-peak times and then delivering the energy during peak-demands times, more efficient utilization of the present utility-grid power-generating plants and the already existing power transmission lines will be accomplished. These systems also have the capability of isolating users from utility-grid power failures, transients, and AC noise.

20 Claims, 2 Drawing Sheets

U.S. PATENT DOCUMENTS

| | | | |
|---|---|---|---|
| 5,043,843 A | | 8/1991 | Kimura et al. |
| 5,045,170 A | * | 9/1991 | Bullock et al. ............... 204/280 |
| 5,082,811 A | | 1/1992 | Bruno |
| 5,087,437 A | | 2/1992 | Bruno et al. |
| 5,116,560 A | | 5/1992 | Dole et al. |
| 5,116,790 A | | 5/1992 | Bruno et al. |
| 5,196,388 A | | 3/1993 | Shyu |
| 5,242,674 A | | 9/1993 | Bruno et al. |
| 5,252,311 A | | 10/1993 | Riman et al. |
| 5,340,510 A | * | 8/1994 | Bowen ....................... 264/434 |
| 5,362,472 A | | 11/1994 | Lauter et al. |
| 5,362,482 A | | 11/1994 | Lauter et al. |
| 5,407,618 A | | 4/1995 | Stephenson |
| 5,417,956 A | | 5/1995 | Moser |
| 5,711,988 A | | 1/1998 | Tsai et al. |
| 5,730,874 A | | 3/1998 | Wai et al. |
| 5,731,948 A | | 3/1998 | Yializis et al. |
| 5,738,919 A | | 4/1998 | Thomas et al. |
| 5,744,258 A | | 4/1998 | Bai et al. |
| 5,776,239 A | | 7/1998 | Bruno |
| 5,797,971 A | | 8/1998 | Zheng et al. |
| 5,800,857 A | | 9/1998 | Ahmad et al. |
| 5,833,905 A | | 11/1998 | Miki |
| 5,850,113 A | | 12/1998 | Weimer et al. |
| 5,867,363 A | | 2/1999 | Tsai et al. |
| 5,900,223 A | | 5/1999 | Matijevic et al. |
| 5,929,259 A | | 7/1999 | Lockemeyer |
| 5,973,175 A | | 10/1999 | Bruno |
| 5,973,913 A | | 10/1999 | McEwen et al. |
| 6,005,764 A | | 12/1999 | Anderson et al. |
| 6,072,688 A | | 6/2000 | Hennings et al. |
| 6,078,494 A | | 6/2000 | Hansen |
| 6,195,249 B1 | | 2/2001 | Honda et al. |
| 6,228,161 B1 | | 5/2001 | Drummond |
| 6,243,254 B1 | | 6/2001 | Wada et al. |
| 6,268,054 B1 | | 7/2001 | Costantino et al. |
| 6,294,620 B1 | | 9/2001 | Huang et al. |
| 6,296,716 B1 | | 10/2001 | Haerle et al. |
| 6,331,929 B1 | | 12/2001 | Masuda |
| 6,352,681 B1 | | 3/2002 | Horikawa et al. |
| 6,410,157 B1 | | 6/2002 | Nakamura |
| 6,447,910 B1 | | 9/2002 | Wataya |
| 6,485,591 B1 | | 11/2002 | Nakao |
| 6,501,639 B2 | | 12/2002 | Takafuji |
| 6,550,117 B1 | | 4/2003 | Tokuoka |
| 6,673,274 B2 | | 1/2004 | Venigalla et al. |
| 6,692,721 B2 | | 2/2004 | Hur et al. |
| 6,703,719 B1 | * | 3/2004 | McConnell .................. 290/52 |
| 6,715,197 B2 | | 4/2004 | Okuyama |
| 6,749,898 B2 | | 6/2004 | Nakamura |
| 6,905,989 B2 | | 6/2005 | Ellis et al. |
| 7,033,406 B2 | * | 4/2006 | Weir et al. .................. 29/623.5 |
| 7,068,898 B2 | * | 6/2006 | Buretea et al. ............. 385/123 |
| 7,228,050 B1 | * | 6/2007 | Buretea et al. ............. 385/141 |
| 7,595,109 B2 | * | 9/2009 | Weir et al. .................. 428/403 |
| 2001/0010367 A1 | * | 8/2001 | Burnell-Jones ........ 252/301.36 |
| 2002/0186522 A1 | | 12/2002 | Honda et al. |
| 2003/0025397 A1 | * | 2/2003 | Young et al. .................. 307/64 |
| 2003/0052658 A1 | * | 3/2003 | Baretich et al. ............. 323/284 |
| 2004/0071944 A1 | * | 4/2004 | Weir et al. .................. 428/209 |
| 2004/0135436 A1 | * | 7/2004 | Gilbreth et al. ............... 307/18 |
| 2006/0210779 A1 | | 9/2006 | Weir et al. |
| 2007/0148065 A1 | | 6/2007 | Weir et al. |
| 2008/0016681 A1 | | 1/2008 | Eisenring |
| 2009/0326729 A1 | * | 12/2009 | Hakim et al. ............... 700/295 |

FOREIGN PATENT DOCUMENTS

| | | |
|---|---|---|
| JP | 55154321 | 12/1980 |
| JP | 63248719 | 10/1988 |
| JP | 01179721 | 7/1989 |
| JP | 03068102 A | 3/1991 |
| JP | 05017150 A | 1/1993 |
| JP | 07291607 A | 11/1995 |
| JP | 11147716 | 6/1999 |
| JP | 2003192343 | 7/2003 |
| WO | WO 93/16012 | 8/1993 |

OTHER PUBLICATIONS

J. Kuwata et al., "Electrical Properties of Perovskite-Type Oxide Thin-Films Prepared by RF Sputtering", Jpn J. Appl. Phys., Part 1, 1985, 413-15.

F. Sears et al., "Capacitance—Properties of Dielectrics", University of Physics, Addison Wesley Publishing Company, Inc., Feb. 1984, pp. 516-533.

Mitsubishi Polyester Film Corporation specification sheet for Hostaphan (R) RE film for capacitors, Copyright 2007.

U.S. Appl. No. 10/917,144.

U.S. Appl. No. 11/453,581.

U.S. Appl. No. 11/497,744.

Beheir et al., "Studies on the liquid-liquid extraction and ion and precipitate flotation of Co(II) with decanoic acid," Journal of Radioanalytical and Nuclear Chemistry, Articles, vol. 174, No. 1 (1992) 13-22.

* cited by examiner

SYSTEMS AND METHODS FOR UTILITY GRID POWER AVERAGING, LONG TERM UNINTERRUPTIBLE POWER SUPPLY, POWER LINE ISOLATION FROM NOISE AND TRANSIENTS AND INTELLIGENT POWER TRANSFER ON DEMAND

This application is a continuation-in-part of U.S. patent application Ser. No. 11/400,875, entitled "Electrical-Energy-Storage Unit (EESU) Utilizing Ceramic and Integrated-Circuit Technologies for Replacement of Electrochemical Batteries," filed Apr. 10, 2006, now U.S. Pat. No. 7,595,109 and naming Richard D. Weir and Carl W. Nelson as inventors; which in turn is a continuation of U.S. patent application Ser. No. 09/833,609, (now U.S. Pat. No. 7,033,406) entitled "Electric-Energy-Store Unit (EESU) Utilizing Ceramic and Integrated-Circuit Technologies for Replacement of Electrochemical Batteries," filed Apr. 12, 2001, and naming Richard Dean Weir and Carl Walter Nelson as the inventors. The above-referenced applications are hereby incorporated by reference herein in their entirety.

FIELD OF THE INVENTION

The present application relates generally to devices and techniques for unique uninterruptible backup power provision, utility grid power isolation from transients and noise, and for providing power averaging for utility grids.

BACKGROUND OF THE INVENTION

The most common method of providing line isolation and electrical power grid backup is through the use of uninterruptible power supplies/sources (UPS) as a secondary power source for providing sufficient power until another secondary power source such as a motor generator is operational and providing stabilized power. This basic configuration is illustrated in FIG. 1. As shown, some electrical load 100 (e.g., a campus, office building, manufacturing facility, data center, residence, hospital, etc.) normally receives electrical power from a utility company via the electrical power grid 110. In the event that power cannot be provided by the utility, e.g., blackout conditions, demand response power reductions, etc., one or more generator based secondary power sources 120 are available. Here "DG" refers to available diesel generators. Precisely which power source is used at any particular time is controlled by power electronic switch 115. In the simplest example, power is switched from one or the other of utility grid 110 and secondary power source 120, but in other cases power can be delivered from some combination of the two. However, since secondary power sources such as generators typically take several seconds to several minutes to bring on line, and additional secondary power source (UPS 130) is used to provide short term but quickly available power until power from generators is available.

The most common types of motor generator units are internal combustion engines (ICs, whether gasoline, diesel or natural gas based), gas turbines (GTs), and microturbines (MTs). In addition to having finite start-up times, all of these types of motor generator units have various other drawbacks. For example, the generators are typically complex machines that require special operation and routine maintenance, their electrical efficiency is typically in the range of 20-40%, the equipment lifetime may be 10-20 years, they require combustible and sometimes dangerous fuels, they produce various emissions, and their availability (e.g., as affected by device failures) can be limited to 90-95%. Moreover, initial equipment costs, fuel costs, and maintenance costs can make such generators a very expensive secondary power source.

UPS systems use stored energy as a secondary power source to protect the critical load and provide sufficient time to switch motor generators on-line to assure no loss in power to the user. The reliability of this stored energy is fundamental to the reliability of the system. Due to their advantages in cost, energy storage density, discharge characteristics, and infrastructure, lead-acid batteries are the most commonly used type of stored energy in UPS systems today. In particular, valve-regulated lead-acid (VRLA) batteries are dominant in this application. However, despite battery manufacturers' best efforts to improve their products, experience has shown that the useful life of a VRLA battery array in conventional double-conversion UPS systems is two to three years. Beyond two years, cell failure rates quickly reach unacceptable levels.

Electrochemical batteries prematurely reach end of life for two reasons: manufacturing defects and battery management issues. Manufacturing defects include "cold" welds between adjacent cells; inter-cell shorts; reversed plates; incomplete casting of the battery straps resulting in dropped plates; defects in paste mixing, which lead to poor paste adhesion; and contamination of the paste or electrode. To overcome these inherent problems of lead-acid batteries, a battery management strategy is typically tailored to the type of battery and its application. For example, VRLA batteries in conventional double-conversion UPS systems are float charged, that is they are continuously supplied with a low charging voltage. The circuit topology necessary for this can cause a significant amount of heat to be continuously generated in the batteries. In flooded lead-acid batteries made with lead-calcium grids, the batteries are not continuously float charged. Nevertheless, other battery maintenance strategies may be important. For example, battery temperature may need to be tightly controlled to reduce corrosion that destroys the battery's capacity to generate current. Limiting the depth of discharge is important in controlling electrolyte stratification in flooded lead-acid batteries. Stratification is the increase of electrolyte specific gravity at the bottom of the battery, and techniques to ameliorate stratification can be difficult and/or costly. Thus, current secondary power source system technology suffers from a variety of drawbacks.

Accordingly, it is desirable to have improved devices and techniques for providing secondary power sources for use as backup power to grid-supplied electrical power.

SUMMARY OF THE INVENTION

It has been discovered that the use of electrical energy storage unit (EESU) technology can provide power averaging for utility grids. Such EESUs can also be used to construct a system capable of storing electrical energy over specified periods (e.g., 24 hours) to provide peak power to homes, commercial sites, and industrial sites. By charging these power averaging units during non-peak times and then delivering the energy during peak-demands times, more efficient utilization of the present utility-grid power-generating plants and the already existing power transmission lines will be accomplished. These systems also have the capability of isolating users from utility-grid power failures, transients, and AC noise.

In one embodiment in accordance with the invention, a system includes at least one electrical energy storage unit (EESU) comprising a high-permittivity ceramic material and a plurality of electrodes. A plurality of solid-state switches are coupled between the at least one EESU and a utility power grid. The at least one EESU is configured to receive electricity from the utility power grid according to an activation state of at least one of the plurality of solid-state switches. The system also includes a control computer coupled to the at least one of the plurality of solid-state switches. The control computer is configured to adjust the activation state of the at least one of the plurality of solid-state switches.

In another embodiment in accordance with the invention a method is disclosed. At least one electrical energy storage unit (EESU) comprising a high-permittivity ceramic material and a plurality of electrodes is provided. The at least one EESU is selectively charged with electricity from a utility power grid. A charging rate varies over a time period according to a peak price of the electricity from the utility power grid. Current is selectively discharged from the at least one EESU to a load according to a desired current flow rate.

In still another embodiment in accordance with the invention an apparatus includes: a means for providing at least one electrical energy storage unit (EESU) comprising a high-permittivity ceramic material and a plurality of electrodes; a means for selectively charging the means for providing at least one EESU with electricity from a utility power grid, wherein a charging rate varies over a time period according to a peak price of the electricity from the utility power grid; and a means for selectively discharging current from the means for providing at least one EESU to a load according to a desired current flow rate.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

Figure 1:
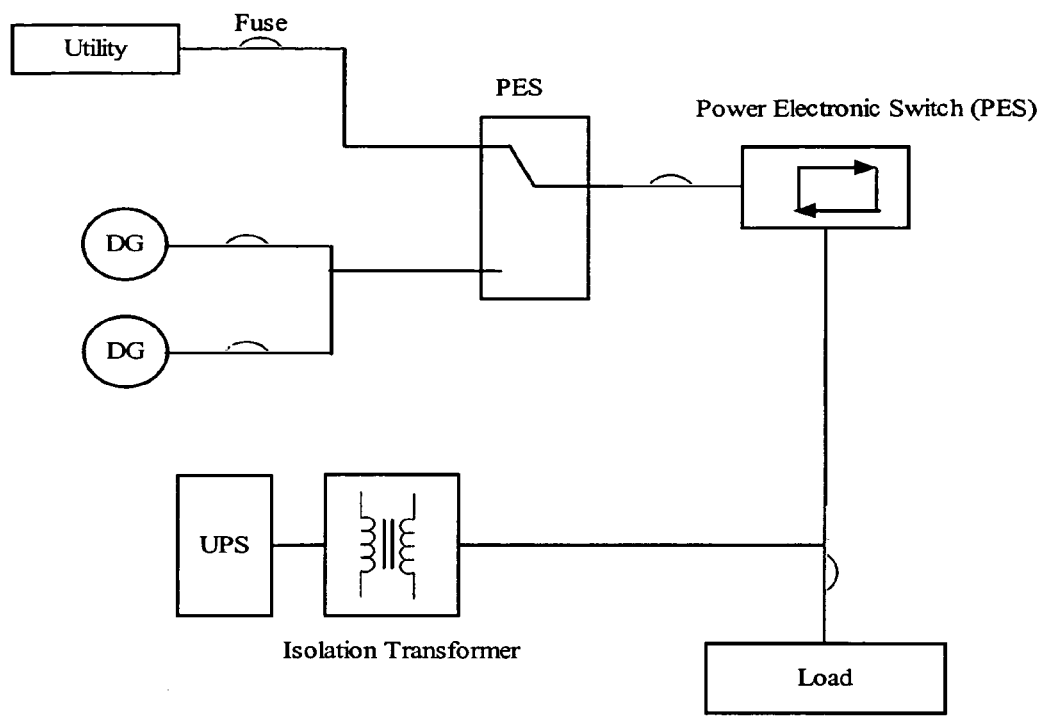
FIG. 1 simplified block diagram of a prior art backup power system.

The following sets forth a detailed description of at least the best contemplated mode for carrying out the one or more devices and/or processes described herein. The description is intended to be illustrative and should not be taken to be limiting.

The systems, devices, and techniques of the present application utilize the electrical energy storage unit (EESU) technology described in the aforementioned '406 patent. In a typical example, an EESU has as a basis material a high-permittivity composition-modified barium titanate ceramic powder. This powder can be double coated with a first aluminum oxide coating and a second calcium magnesium aluminosilicate glass coating. The components of the EESU are manufactured using various ceramic fabrication techniques including screen printing of alternating layers of nickel electrodes and high-permittivity composition-modified barium titanate powder, sintering to a closed-pore porous body, and hot-isostatic pressing to a void-free body. The components can be configured into a multilayer array with the use of various different joining or soldering techniques, so as to provide a parallel configuration of components that has the capability to store electrical energy at a desired capacity.

When used as a UPS and/or generator replacement for secondary power provision or as part of a primary power source solution, EESUs along with associated hardware and software can generally provide: (1) primary energy storage for power averaging; (2) a communication link for providing real-time intelligent grid power transfer on demand; (3) line isolation from transients and noise; (4) protection against utility grid temporary power loss; (5) on-line primary energy storage incremental increases; (6) no emission of any environmentally hazardous products, liquids, or gasses; (7) a "green" product; and (8) cost competitiveness with other technologies.

As noted in the '406 patent, EESUs can be used for storing electrical power generated from various sources such as solar photovoltaic cells or other alternative sources for residential, commercial, or industrial applications. The EESUs will also allow power averaging over various primary power sources including traditionally supplied electrical power from utilities. EESUs have a variety of advantages over other technologies such as various lead-acid battery systems. EESU initial specifications generally do not degrade due to being fully discharged or recharged. Deep cycling of EESUs through the life of any commercial product that may use them will not cause their specifications to be degraded. EESUs can also be rapidly charged without damaging the material or reducing its life. For example, the cycle time to fully charge a 52 kW·h EESU would be in the range of 4 to 6 minutes with sufficient cooling of the power cables and connections. Banks of EESUs can preferentially store energy being delivered to them from the present day utility power grid during off-peak times (e.g., at night when demand is low) and then deliver the energy as needed including during peak demand periods. During peak demand periods, EESUs can still be charged, but typically at a rate that is cost-effective. This method of electrical power averaging generally reduces demands on the power grid (e.g., as part of a utility company's demand response program), allows for more effective use of alternative power sources, and provides end users more stable power sources.

Thus, the EESU contains the enabling technology for supporting primary on-line energy storage capability and providing secondary power storage capability. In contrast, lead-acid battery technology, with its restrictive capabilities, is limited to secondary utility-grid energy storage. A more detailed comparison of the technologies is shown in Table I.

TABLE I

|  | EESU | LEAD-ACID |
|---|---|---|
| Energy Density, W · h/L | 752 | 70.2 |
| Specific Energy, W · h/kg | 495 | 46.0 |
| Specific Power, W/kg | *>10,000 | 150 |
| High Discharge Rate | No | Yes |
| Life Reduction with Deep Cycle Use | Very Low | High |

TABLE I-continued

| | EESU | LEAD-ACID |
|---|---|---|
| Energy Storage Reduction with Temperature | Very Low | Very High |
| Contains Hazardous Material | No | Yes |
| Requires Battery Management System | No | Yes |
| Requires Battery Stratification | No | Yes |

*EESU power delivery is generally only restricted by the electronic circuits due to the extremely low dc internal resistance (e.g., 21.2 μΩ)

Figure 2:
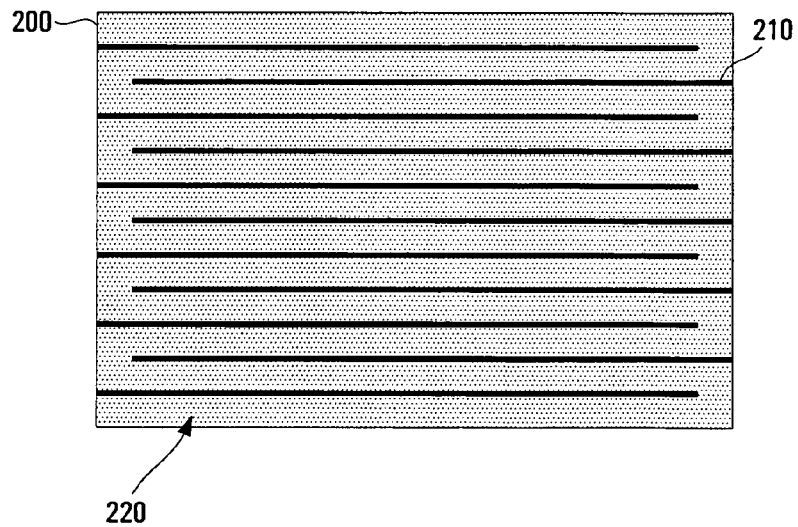
FIG. 2 is a simplified cross-section view of an electrical energy storage unit (EESU).

FIG. 2 is a simplified cross-section view of a component of an electrical energy storage unit (EESU). The basic structure for EESU component 200 includes alternating layers (or partial layers) of electrode material 210 and high-permittivity dielectric material (220), e.g., composition-modified barium titanate. This configuration is merely exemplary, and other structures can also be used.

In many embodiments, dielectric material 220 is a composition-modified barium titanate material as described in the aforementioned '406 patent, or as described in U.S. patent application Ser. No. 11/369,255, entitled "Method of Preparing Ceramic Powders Using Chelate Precursors," filed Mar. 7, 2006, and naming Richard D. Weir and Carl W. Nelson as inventors, which is incorporated by reference herein in its entirety. Additionally, U.S. Pat. No. 6,078,494 (hereby incorporated by reference herein in its entirety) describes examples of various doped barium titanate dielectric ceramic compositions. More specifically, the '494 patent describes a dielectric ceramic composition comprising a doped barium-calcium-zirconium-titanate of the composition $(Ba_{1-\alpha-\mu-\nu}A_{\mu}D_{\nu}Ca_{\alpha})[Ti_{1-x-\delta-\mu'-\nu'}Mn_{\delta}A'_{\mu'}D'_{\nu'}Zr_x]_zO_3$, where A=Ag, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 < \delta \leq 0.01$, and $0.995 \leq z \leq 0 \leq \alpha \leq 0.005$. These barium-calcium-zirconium-titanate compounds have a perovskite structure of the general composition $ABO_3$, where the rare earth metal ions Nd, Pr, Sm and Gd (having a large ion radius) are arranged at A-sites, and the rare earth metal ions Dy, Er, Ho, Y, Yb and Ga (having a small ion radius) are arranged at B-sites. The perovskite material includes the acceptor ions Ag, Dy, Er, Ho, Y or Yb and the donor ions Nb, Mo, Nd, Pr, Sm and Gd at lattice sites having a different local symmetry. Donors and acceptors form donor-acceptor complexes within the lattice structure of the barium-calcium-zirconium-titanate according to the invention. The dielectric ceramic compositions described by the '494 patent are just some of the many types of ceramic compositions that can be fabricated using the processes and techniques of the present application. In other embodiments, different high-permittivity dielectric materials are used.

As noted above, in many embodiments the composition-modified barium titanate material is coated to provide additional performance. Aluminum oxide coatings and calcium magnesium aluminosilicate glass coatings are applied to calcined composition-modified barium titanate powder to enhance material features and improve manufacturing capabilities. These coating materials have high voltage breakdown and when coated onto the composition-modified barium titanate will increase the breakdown voltage of the material. Fully densified ceramic components of this powder coated with, for example, 100 Å of aluminum oxide as the first coating and 100 Å of calcium magnesium aluminosilicate glass as the second coating, can be safely charged to 3500 V. These coatings also assist in significantly lowering the leakage and aging of ceramic components comprised of the calcined composition-modified barium titanate powder.

The calcium magnesium aluminosilicate glass coating also assists in lowering the sintering and hot-isostatic-pressing temperatures to, for example, 800° C. This lower temperature eliminates the need to use expensive platinum, palladium, or palladium-silver alloy as the terminal metal. This temperature is in a safe range that allows nickel to be used, providing a major cost saving in material expense and also power usage during the hot-isostatic-pressing process. Also, since the glass becomes easily deformable and flowable at these temperatures it will assist in removing the voids from the EESU material during the hot-isostatic-pressing process.

In another embodiment, the alumina-coated composition-modified barium titanate powder is dispersed in a poly(ethylente terephalate) plastic matrix in place of the calcium magnesium aluminosilicate glass matrix. These matrix materials have dielectric breakdown strengths that are very similar, but the plastic matrix makes for substantially lower process temperature and pressure, leading to lower fabrication cost. This lower processing temperature also allows for the use of aluminum as the electrode material. Due to the plastic matrix being exceptionally soft at around 200° C., the ceramic dispersed particles can be preferentially oriented by applying a full polarization technique. Various other plastics can also be used.

Although many different metals and metal alloys can be used for electrode material 210, nickel is advantageous for several reasons. EESU electrodes can be produced by screen-printing multiple layers of nickel electrodes with screening ink from nickel powder. Interleaved between nickel electrodes are dielectric layers with screening ink from calcined double-coated high-permittivity calcined composition-modified barium titanate powder. Each screening ink typically contains appropriate plastic resins, surfactants, lubricants, and solvents, resulting in a proper rheology for screen printing. The number of these layers can vary depending on the electrical energy storage requirements. Each layer is dried before the next layer is screen printed, and each nickel electrode layer is alternately preferentially aligned to each of two opposite sides of the component automatically during this process. These layers are screen printed on top of one another in a continuous manner. When the specified number of layers is achieved, the component layers are then baked to obtain by further drying sufficient handling strength of the green plastic body. Then the array is cut into individual components to the specified sizes.

Alternatively, the dielectric powder is prepared by blending with plastic binders, surfactants, lubricants, and solvents to obtain a slurry with the proper rheology for tape casting. In tape casting, the powder-binder mixture is extruded by pressure through a narrow slit of appropriate aperture height for the thickness desired of the green plastic ceramic layer onto a moving plastic-tape carrier, known as a doctor-blade web coater. After drying to develop sufficient handling strength of the green plastic ceramic layer this layer is peeled away from the plastic-tape carrier. The green plastic ceramic layer is cut into sheets to fit the screen-printing frame in which the electrode pattern is applied with nickel ink. After drying of the electrode pattern, the sheets are stacked and then pressed together to assure a well-bonded lamination. The laminate is then cut into components of the desired shape and size. The components are treated for binder-burnout and sintering steps. After this process is completed the components are then properly prepared for the hot isostatic pressing to eliminate voids. Next the components are side lapped on the connection side to expose the preferentially aligned nickel electrodes. These sides can then be dipped into ink from nickel powder that has been prepared to have the desired rheology. Then side conductors of nickel are dipped into the same ink and then are clamped onto each side of the components that have been dipped into the nickel powder ink. The components are then fired to bond the nickel bars to the components, which can then be assembled into various arrays.

While the EESU components can be packaged in a variety of materials, one embodiment packages the components within a hermetically sealed metal box or container. For EESUs to be used in inland locations, the metal could be Type 316 stainless steel. If the EESU is located near or on the ocean, (or some other corrosive environment) other metals such as titanium can be used. This generally provides the long lifetime (e.g., >50 years) required or desired by utilities and the like.

Figure 3:
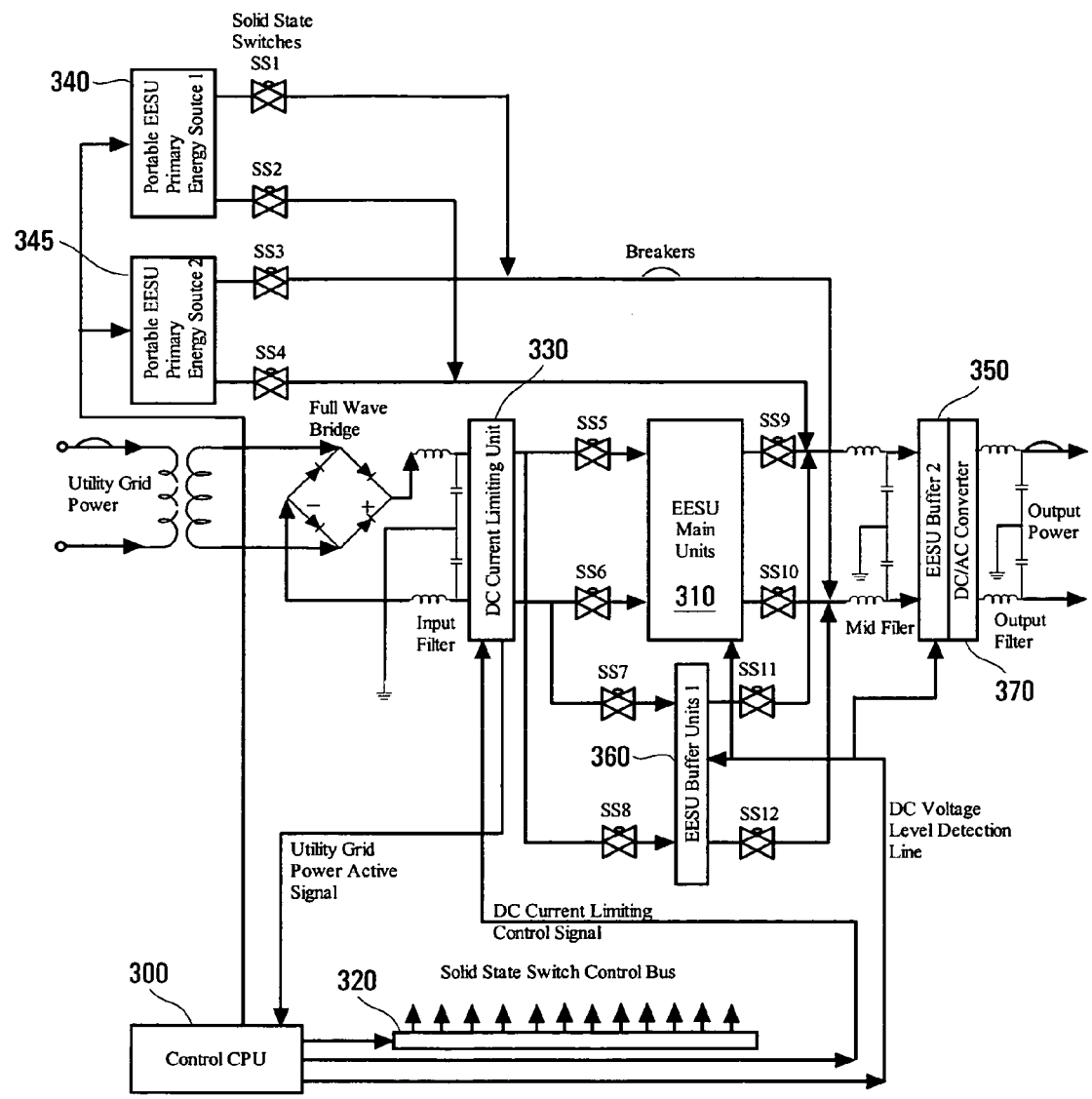
FIG. 3 illustrates a simplified block diagram of a system where utility grid charged EESUs operate to deliver electrical energy to users.

FIG. 3 illustrates a simplified block diagram of a system where utility grid charged EESUs operate as a primary source of electrical energy to users in homes, commercial sites, industrial sites, and the like. The features of this system include: (1) automated utility grid power averaging; (2) unique characteristics of the EESU providing effective isolation from power line noise and transients; (3) utility grid primary power backup along with utilizing portable EESU based power delivery units for providing long term power backup capability; and (4) real-time additions to the EESU main units without disrupting the output power.

A very high percentage of the utility companies charge more for energy during peak-demand times which are typically from 4:00 PM to about 8:00 PM, but can vary depending on time of year, region, weather conditions, etc. During that time, the cost of energy will be increased significantly for each step-up in energy usage. For example, residential and small business off-peak cost for power is in the range of $0.05/kW·h and the peak cost could be $0.25/kW·h or higher. Industrial sites range from $0.12/kW·h for the non-peak energy cost to $0.35/kW·h or higher in the peak energy demand times. Peak-demand energy costs have become a significant portion of the electrical bills for most users in the USA. This reference data was supplied by Austin Energy which is a municipality-owned utility in Austin, Tex. Additionally, many utilities have demand response programs for business customers. These programs provide financial incentives and other benefits to participating customers to curtail energy use in general, or during certain events has designated by the utility. These actions are intended to help provide a reliable amount of power during emergencies or when demand otherwise exceeds capacity.

The system of FIG. 3 provides electrical energy users a method of averaging their energy usage over a period of time, for example a 24-hour period. This method is typically referred to as power averaging or in some cases "peak shaving." In a power averaging mode, solid state switches (SS5, SS6, SS9, and SS10) are active (open) and all other solid state switches are inactive (closed). Control computer 300 establishes an energy flow rate (e.g., kW·h) that will provide the user with sufficient energy for the set period, e.g., a 24-hour period. This is accomplished by controlling one or more of the relevant solid state switches (either directly or via switch control bus 320) and/or by controlling current limiting unit 330. In some embodiments, computer 300 can take multiple factors into consideration such as weather information, projected power needs, pricing information, or the like. It can automatically determine flow rate based on specified parameters or it can allow a user to specify the desired flow rate explicitly.

The EESU main units 310 will be configured to provide sufficient energy to the user during the peak demand time without increasing the energy supplied by the utility grid. However, if the energy stored in EESU main units 310 is reduced below a set minimum level, control computer 300 will increase the system input energy flow rate from the utility grid so that the primary minimum energy storage level is maintained. Note that electricity from the utility grid is generally delivered as an AC current, and so the system utilizes some manner of rectification (e.g., the full wave bridge rectifier shown) to convert the AC current to a DC current for use by EESU main units 310. Others steps may need to be taken to modify the input current from the utility grid. For example, transformers can be used to adjust the AC voltage, various input filters can be used, and the like. At the end of the peak energy demand period, the input energy will be sufficient to not only supply output energy demand but also recharge EESU main units 310. For example, an average home in the United States uses approximately 600 kW·h per month. It is estimated that around 70% of the energy is used in the peak demand period. On a yearly basis, 5,040 kW·h of energy is used in the peak-demand period and 2,160 kW·h is consumed in the non-peak-demand period. The yearly cost in this estimate would be $1,260 for the peak-demand energy and the cost for the energy in the non peak demand period is $108 with a year total cost of $1,368. With the power averaging unit, the total yearly cost would be $360 This would provide a yearly savings of $1,008. The estimated cost for the power averaging system for a home with this amount of energy usage would be in the range of $4,000 to $5,000. Of course, in the industrial utility-grid energy supply market, where the cost of energy is higher and the difference between the non-peak costs and peak costs are significantly wider, the return on the investment would be much faster and the yearly savings would be significant. This feature and the features indicated below make this system an extremely attractive investment for users in all areas.

Another aspect of the system of FIG. 3 is the ability to provide backup power to ensure continuous power to the user in the case where the utility grid power is interrupted. If the control computer 300 detects an input power loss (e.g., via current sensing circuitry included in current limiting unit 330 or elsewhere in the system), SS5 and SS6 can be deactivated. Power will then be delivered by EESU main units 310 without simultaneous charging of the units. If the energy in EESU main units 310 is reduced to a set level, then control computer 300 can automatically notify the user or bring additional power online.

For example, EESU main unit capacity may be selected to provide adequate power for a set period of time. When the power level drops below a set threshold, the user can then make the decision to order additional power from another source. Other sources can include additional EESUs that are either maintained at the user's facility or that can be readily delivered, e.g., a trailer including charged EESUs. Portable EESU units 340 and 345 illustrate examples of such devices. Because of the various EESU characteristics (see, e.g., Table I) EESUs are highly portable due to their energy density, material safety, and low discharge rate. For example, if a trainload of EESUs was charged and held in reserve in a very hot climate for a year, only approximately 0.22% of the energy will be lost to leakage currents. Thus, various transportation and shipping platforms can be used to deliver EESUs on relatively short notice.

When control computer 300 detects that additional EESUs are needed and in place, it will ensure that EESU buffer 350 is fully charged and then will deactivate switches SS9 and SS10 and activate switches SS1 and SS2. EESU buffer units 350 and 360 are typically formed from one more EESUs (generally smaller in number and/or capacity than EESU main units 310) to provide power for short periods of time during switching operations. The fully charged EESU buffer 350 will ensure that the output power is not interrupted during the process of activating the portable EESU 340. If control computer 345 further determines that the portable EESU 340 is depleted to a specified level, it will again ensure that the EESU buffer 350 is fully charged, deactivate switches SS1 and SS2, and activate switches SS3 and SS4 which will complete the action of activating portable EESU 345. This process of switching between portable EESUs can continue until computer control 300 determines that power is again available via the utility grid. Appropriate switch reactivation (SS5 and SS6) can charge EESU main units 310 up to an acceptable level. When that has been completed, all solid state switches associated with the portable power will be deactivated and switches SS9 and SS10 will be activated. This completes the action of providing power backup.

Yet another feature of this architecture is to provide real time incremental changes to EESU main unit energy storage capability. This is sometimes called "hot swapping." This feature can also be used to perform maintenance on EESU main units 310. When the control computer 300 is notified to activate this feature it will first ensure that EESU buffers 350 and 360 are fully charged, then switches SS5, SS6, SS9, and SS10 will be deactivated. Next, switches SS7, SS8, SS11, and SS12 will be activated. Control computer 300 will then increase the power delivery to a level ensuring that EESU buffers 350 and 360 remain at full charge. When control computer 300 is notified that the process has been completed, it will again ensure that all energy storage buffers are fully charged and then deactivate switches SS7, SS8, SS11, and SS12. Subsequently, switches SS5, SS6, SS9, and SS10 are activated. This then completes the operation needed to add, remove, replace, or repair EESUs or other portions of the system.

The basic architecture of FIG. 3 can be extended to provide energy on demand to selected locations on an intelligent utility grid. For example, systems such as that illustrated in FIG. 3 could be placed at strategic locations on computer controlled utility grids and be fully charged so that grid energy could be delivered on demand to locations requiring critical electrical grid energy, or where demand is particularly high (and thus the power is potentially more profitable). The power averaging feature allows for higher average energy outputs for the already existing utility grid power generating plants. Such an intelligent grid energy storage feature could allow for an increase in yearly output of approximately 40% to 45%.

It should be noted that various components illustrated in FIG. 3, such as the switches, current limiting units, control computer, and control bus can be constructed using well known components as will be understood by those skilled in the art. Additionally, although the system illustrated includes a DC/AC conversion component 370, other applications may not require such features. For example, many telecommunication facilities are designed to use DC power directly, and so an additional conversion may not be needed. Numerous system variations will be readily apparent depending on the specific application of the system. Additionally, the prior art system of FIG. 2 can generally be improved upon by replacing UPS and/or generator components with EESUs, and corresponding charging, monitoring, and switching equipment. Such implementations need not implement features such as power averaging.

Although the present invention has been described with respect to specific embodiments thereof, various changes and modifications may be suggested to one skilled in the art and it is intended that the present invention encompass such changes and modifications as fall within the scope of the appended claims.

What is claimed is:

1. A system comprising:
  at least one electrical energy storage unit (EESU) coupled in series between a utility power grid and a load, the EESU comprising a composite material and a plurality of electrodes, the composite material comprising a high-permittivity ceramic material dispersed in a plastic matrix;
  a plurality of solid-state switches coupled between the at least one EESU and the utility power grid, wherein the at least one EESU is configured to receive electricity from the utility power grid according to an activation state of at least one of the plurality of solid-state switches; and
  a control computer coupled to the at least one of the plurality of solid-state switches, wherein the control computer is configured to adjust the activation state of the at least one of the plurality of solid-state switches; and
  a current limiting circuit coupled between the at least one EESU and the utility power grid, wherein the current limiting circuit is further coupled to the control computer.

2. The system of claim 1 wherein the high-permittivity ceramic material further comprises a composition modified barium titanate material.

3. The system of claim 2 wherein the composition modified barium titanate material further comprises a powder, and wherein the powder further comprises an aluminum oxide coating.

4. The system of claim 1 further comprising:
  a second plurality of solid-state switches coupled between the at least one EESU and the load, wherein at least one of the second plurality of solid state switches is coupled to the control computer.

5. The system of claim 4 further comprising:
  at least one buffer EESU coupled between the second plurality of solid-state switches and the load.

6. The system of claim 4 further comprising:
  at least one portable EESU coupled to the load and configured to deliver electricity to the load when the at least one EESUs charge state drops below a threshold.

7. The system of claim 1 further comprising:
  at least one buffer EESU coupled in parallel with the at least one electrical energy storage unit and between the utility power grid and the load.

8. The system of claim 7 further comprising:
  a third plurality of solid-state switches coupled to the at least one buffer EESU and to the control computer; wherein the third plurality of solid-state switches is configured to connect the at least one buffer EESU to the utility power grid and the load according to the control computer.

9. The system of claim 1 wherein the control computer is further configured to adjust at least one of an EESU charge rate and an EESU discharge rate according to a power averaging scheme.

10. The system of claim 1 wherein the control computer is configured to adjust the activation state of the at least one of the plurality of solid-state switches depending upon at least one of: weather information, projected power needs, pricing information, an established current flow rate, and time of day.

11. The system of claim 1 further comprising:
  a control bus coupled between the control computer and the at least one of the plurality of solid-state switches.

12. The system of claim 1, wherein the composite material comprises the high-permittivity ceramic material in particulate form, the particulate form dispersed in the plastic matrix.

13. The system of claim 1 wherein the current limiting circuit is coupled in series between the at least one EESU and the utility power grid.

14. A system comprising:
- at least one electrical energy storage unit (EESU) coupled in series between a utility power grid and a load, the EESU comprising a composite material and a plurality of electrodes, the composite material comprising a high-permittivity ceramic material dispersed in a plastic matrix;
- a converter coupled in series between the at least one EESU and the utility power grid, the converter to convert alternating current to direct current;
- a direct current limiting unit coupled in series between the converter and the at least one EESU;
- a set of switches coupled between the at least one EESU and the utility power grid, wherein the at least one EESU is configured to receive electricity from the utility power grid according to an activation state of at least one of the set of switches; and
- a control computer coupled to the at least one of the set of switches, wherein the control computer is configured to adjust the activation state of the at least one of the set of switches, the control computer coupled to the direct current limiting unit to control the direct current limiting unit.

15. The system of claim 14, further comprising a second EESU coupled in parallel with the at least one EESU and further comprising a second set of switches coupled between the direct current limiting unit and the second EESU, the control computer coupled to at least one switch of the second set of switches to adjust the activation state of the at least one switch of the second set of switched to control charging of the second EESU.

16. The system of claim 14, further comprising a second converter coupled in series between the at least one EESU and the load, the second converter to convert direct current to alternating current.

17. The system of claim 16, further comprising a portable EESU coupled between the at least one EESU and the second converter.

18. A system comprising:
- an electrical energy storage unit (EESU) coupled in series between a utility power grid and a load;
- a first converter coupled in series between the EESU and the utility power grid, the first converter comprising a full wave bridge to convert alternating current to direct current;
- a direct current limiting unit coupled in series between the converter and the EESU;
- a second converter coupled in series between the EESU and the load, the second converter to convert from direct current to alternating current;
- a set of switches coupled between the EESU and the direct current limiting unit, wherein the EESU is configured to receive electricity from the utility power grid according to an activation state of at least one of the set of switches; and
- a control computer coupled to the at least one of the set of switches, wherein the control computer is configured to adjust the activation state of the at least one of the set of switches, the control computer coupled to the direct current limiting unit to control the direct current limiting unit.

19. The system of claim 18, wherein the control computer is control the direct current limiting unit to provide a constant energy flow to provide the EESU with sufficient power for a 24-hour period.

20. The system of claim 18, further comprising a second EESU coupled in parallel to the EESU and in series between the direct current limiting unit and the second converter.

* * * * *